United States Patent [19]

Kresock

[11] 4,237,489

[45] Dec. 2, 1980

[54] VIDEO BLACK LEVEL REFERENCE SYSTEM

[75] Inventor: John M. Kresock, Elba, N.Y.

[73] Assignee: GTE Products Corporation, Stamford, Conn.

[21] Appl. No.: 15,024

[22] Filed: Feb. 26, 1979

[51] Int. Cl.³ .............................................. H04N 5/19
[52] U.S. Cl. .................................... 358/168; 358/172
[58] Field of Search ................... 307/260, 231; 328/34, 328/139; 358/34, 39, 148, 168, 169, 172

[56] References Cited

U.S. PATENT DOCUMENTS

| | | | |
|---|---|---|---|
| 4,135,209 | 1/1979 | Logan | 358/168 |
| 4,143,398 | 3/1979 | Harwood et al. | 358/34 |

Primary Examiner—Benedict V. Safourek
Attorney, Agent, or Firm—John A. Odozynski

[57] ABSTRACT

A circuit and method for effecting automatic brightness control for a television receiver CRT. The video signal is AC coupled to a signal input of a comparator. The comparator also has a reference input to which is applied a viewer-adjusted reference signal. A DC output voltage is developed in response to the difference in voltages present at the signal and reference inputs. The comparator is rendered sensitive, via a Video Blanking pulse to only the luminance component and a portion of the horizontal sync component of the video signal. The Video Blanking pulse can be synthesized by phase shifting and clipping the horizontal retrace pulses.

8 Claims, 1 Drawing Figure

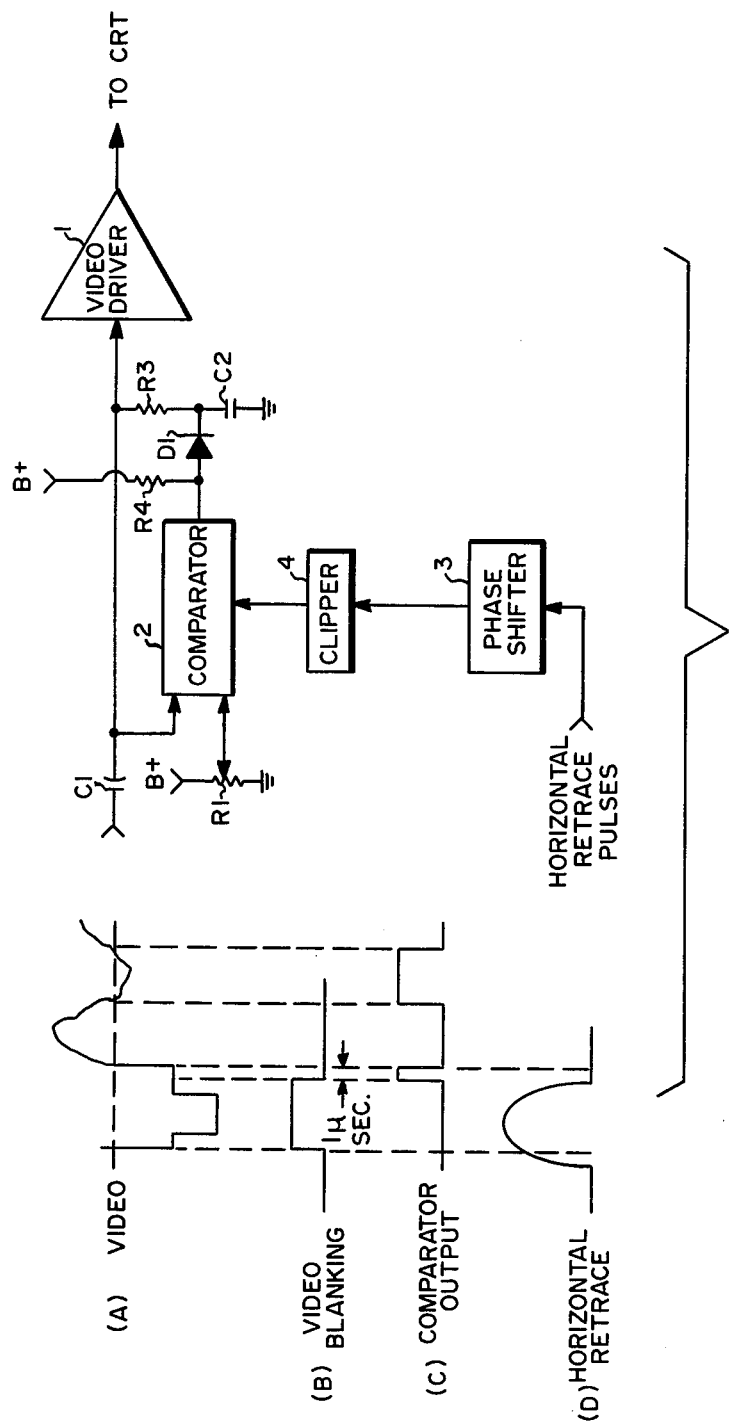

VIDEO BLACK LEVEL REFERENCE SYSTEM

TECHNICAL FIELD

This invention relates to video processing for television receivers and more particularly to a circuit and method for automatically establishing a brightness level.

BACKGROUND ART

U.S. Pat. No. 3,976,836 (hereinafter referred to as the Wheeler patent), assigned to the same assignee as this invention and hereby incorporated by reference, describes and automatic black level setting circuit that operates in a manner related to the subject invention. The circuit described therein effects, in essence, automatic brightness control for a television receiver CRT by sampling the blackest portion of the transcribed video signal and comparing it to a viewer-established reference level. A comparator circuit develops a DC voltage in response to the difference between the sampled video signal and the reference level. The DC voltage is coupled to a control element (cathode) of the CRT so as to maintain its brightness at the desired level, regardless of fluctuations in or variations between the received video signals. That invention represents a substantial improvement over prior art techniques that established an automatic brightness control (i.e., CRT black level) by sampling, for example, the horizontal sync tips or back porch of the horizontal blanking pulse. Such prior art techniques were undesirably susceptible to aberrations in the level of the sync pulses as well as to station-to-station variations in those levels. Accordingly, in order to establish a black level solely in response to the blackest portion of the video signal, it was necessary to render the comparator immune to, inter alia, the horizontal sync components of the composite video signal. This was effectively accomplished by disabling, in various fashions, the comparator circuit through the use of the approximately 12 microsecond wide horizontal blanking pulses that are developed by the receiver during the horizontal synchronization intervals.

Although the invention disclosed in the Wheeler patent represents a substantial improvement over the then-existing art, it manifests an inherent drawback when receiving particular types of video signals. To wit, when receiving scenes approaching a white field, as are encountered, for example, during the broadcast of a hockey game, in which, by definition, the blackest portion of the video signal may be at a white level, the black level setting circuit operates so as to abnormally reduce the brightness level. It is that drawback of an otherwise salutary circuit to which the subject invention is directed.

DISCLOSURE OF THE INVENTION

This invention is a method, and associated circuit, for effecting automatic brightness control. The system samples both the luminance portion of the video signal as well as a portion of horizontal sync component. An output signal is developed in response to the difference between the sampled signals and a reference level.

The circuit includes a comparator that is selectively rendered insensitive to prescribed portions of the video signal. The comparator is controlled by pulses appropriately synthesized from the horizontal retrace pulses.

The invention prevents abnormal whiteness turndown when receiving substantially all-white scenes while avoiding aberrations resulting from variations or fluctuations between horizontal sync pulse characteristics.

BRIEF DESCRIPTION OF THE DRAWING

The drawing is a schematic diagram, partially in block form, of a circuit contemplated by this invention. Informative waveforms are shown as they exist at various points in the circuit.

BEST MODE FOR CARRYING OUT THE INVENTION

For a better understanding of the present invention, together with other and further objects and advantages thereof, reference is made to the following disclosure and appended claims taken in conjunction with the above described drawing.

Referring now to the drawing, the video signal, including a luminance component and a horizontal sync component (front porch, sync tip and back porch) is AC coupled through a capacitor C1 to the input of a Video Driver amplifier 1 and DC coupled therefrom to the receiver's CRT (not shown). The video signal is also AC coupled to a signal input of a comparator 2. For the purposes of this description, the comparator may be substantially identical to the comparator described in the Wheeler patent.

Element 25 therein, a variable resistor R1, connected between a source of voltage B+ and circuit ground, has a wiper coupled to a reference input of the comparator. (The signal and reference inputs of the comparator may be taken to be the base and emitter electrodes, respectively, of transistor 35 of FIG. 1 of the Wheeler patent.) The comparator, in conjunction with a time constant network, establishes the DC voltage input into the video driver and, hence, the brightness level of the CRT. The time-constant network includes a resistor R2 connected between B+ and the anode of a diode D1. The cathode of D1 is coupled through a capacitor C2 to ground. The DC voltage at the junction of D1 and C2 is DC coupled through a resistor R3 to the input of the Video Driver.

For an understanding of this invention it suffices to assume that the comparator is conductive, that is, its output (at the junction of R2 and D1) presents a short circuit to ground whenever the instantaneous DC voltage at the signal input is greater than the DC voltage at the reference input. Conversely, when the DC voltage at the signal input is less than the reference level, it can be assumed that the comparator is nonconductive and its output presents an open circuit. In this manner the DC voltage at the input to the Video Driver is made to depend on the blackest, that is, most negative, level in the video signal.

Specifically, whenever the AC coupled luminance portion (in a manner described below, the comparator will be rendered insensitive to the horizontal synchronizing pulses ) is sufficient to assure that the comparator will be non-conducting, that is, when the voltage corresponding to the blackest level in the transcribed scene becomes less than the reference level, its output will be open-circuited, D1 will be forward-biased and C2 will be charged to B+ through R2 and D1. The DC voltage at both the input of the Video Driver and the signal input of the comparator will increase accordingly. Clearly, a given luminance signal, the higher the DC voltage at the signal input to the comparator, the less frequently will the comparator be in a non-conducting state. Conversely, when the blackest portions of the luminance signal are insufficient to assure a non-conducting comparator (e.g. during a white scene), the comparator output will be short-circuited to ground, D1 will be back-biased, and C2 will be discharged through R3 and the input impedance of the Video Driver. The DC voltage at the input of the Video Driver and the signal input of the comparator will decrease accordingly. Again, for a given luminance signal, a lower DC voltage at the signal input of the comparator will result in the comparator conducting more frequently. In this manner, the viewer can establish, via R1, the desired CRT brightness level. This level will be maintained in response to the blackest level of the luminance signal.

Because it was heretofore deemed desirable to have the system respond to only luminance information, a Video Blanking pulse, substantially coterminous with or perhaps somewhat wider than the nominal 12 microsecond Horizontal Blanking Pulse, was developed and used to render the comparator insensitive to horizontal synchronizing information. As disclosed in the Wheeler patent, the horizontal blanking pulses are coupled to the base of a transistor, has element G1, thereby shorting and assuring that it will be insensitive to horizontal sync pulses. An alternative method of accomplishing the same result is shown in Wheeler's FIG. 2. In that Figure the comparator is disabled during the horizontal pulse interval by effectivley removing the collector supply of the comparator transistor 77. Yet other alternatives suggest themselves. For example, instead of coupling the video signal directly to the signal input of the comparator, it can be coupled to the input of any of the many known types of analog gates; the output of the gate can be coupled to the comparator. The gate in turn may be disabled in response to the Video Blanking pulses, thereby effectively rendering the comparator insensitive to components of the video signal occurring during the period of the Video Blanking pulse.

However, none of the suggested or previously known alternatives mitigate the drawback alluded to above, that is, abnormal brightness turndown during reception of a substantially white field. The abnormal brightness turndown is objectionable because it results in a loss of detail in the "gray" areas of the transcribed scene. During such scenes, the "blackest" portion of the luminance signal will presumably be insufficient to assure that the comparator comes out of conduction, that is, until the DC level at the input of the video driver has reached an undesirably low level. The essence of the subject invention is to develop a Video Blanking pulse in order to ameliorate this condition. The Video Blanking pulse thus conceived allows the comparator to be responsive to a portion of the Horizontal Blanking pulse. For any expected range of threshold voltage settings, this pulse will assure that the comparator output is, for a period of time, non-conducting and that C2 will be charged through R2 and D1. This operation has been found to substantially limit abnormal brightness turndown on all-white scenes.

An appropriate Video Blanking pulse is developed as follows. As is well known, the horizontal deflection system of a standard television receiver develops a horizontal retrace pulse that may occur substantially coincidentally with the transmitted Horizontal Blanking pulse. As shown in the drawing, the retrace pulse can be phase-shifted, within a limited range, by a phase shifter 3 so as to be either retarded or advanced with respect to the transmitted Horizontal Blanking pulse. In practice, some amount of this phase shift results from the operation of the receiver's Horizontal AFC system so that Phase shifter 3 is either superfluous or may be deemed to be comprised by the Horizontal AFC system. In any event, a Horizontal Retrace pulse, waveform (D) of the drawing, advanced approximately 1 microsecond with respect to the leading edge of the Horizontal Blanking pulse, waveform (A), has been found appropriate to accomplish the result desired of this invention. The Horizontal Retrace pulse, so phased, is then coupled by the input of a pulse-shaper or clipper 3. The clipper is characterized by a threshold so that its output voltage, the Video Blanking pulse, is high whenever the amplitude of the Retrace pulse is above the threshold level and low whenever the amplitude of the retrace pulse is below the threshold level. The threshold level is chosen so that the positive-going part of the Horizontal Retrace pulse crosses the threshold at the leading edge of the transmitted Horizontal Blanking pulse. Conversely, the negative-going edge of the retrace pulse crosses the threshold somewhat, approximately 1 microsecond, before the trailing edge of the Horizontal Blanking pulse. The resultant Video Blanking pulse, waveform (B), is coupled to an enabling input, for example, the base of Wheeler's transistor 61, of the comparator so that the comparator is sensitive to the last microsecond of the Horizontal "Back Porch" as well as to the luminance portion of the composite video signal. Specifically, as illustrated in waveform (C), the comparator will be open-circuited during the last microsecond or so of the Horizontal Back Porch and during the times when the luminance voltage is below the reference threshold, indicated by the broken line in waveform (A). Although for simplicity, the voltage at the output of the comparator is shown as a train of rectangular pulses, it is clear that this voltage will be exponentially rising as C2 is charged toward B+ at a rate substantially determined by its value and the value of R2. Conversely during the Video Blanking pulse and at times when the luminance voltage is above the reference threshold, the voltage at the output of the comparator will be at or near ground potential and C2 will discharge at a rate determined by the value of R3 and the input resistance of the Video Driver.

In summary, the essence of the subject invention is an automatic brightness control that operates by sensing primarily the luminance portion of the video signal but, in addition, an appropriate portion of the Horizontal Blanking pulse. In particular, by sampling approximately the last microsecond of the Horizontal Back Porch, abnormal brightness turndown effects are mitigated by avoiding undesired effects relating to variations in horizontal pulse characteristics. It is clear that alothough a specific Video Blanking pulse is described, variations in the pulse itself or the manner in which it is synthesized are contemplated by this invention. Furthermore, alternative methods of rendering the comparator insensitive to prescribed portions of the video signal, including those described above, are deemed to be a part of and anticipated by this application.

Accordingly, while there have been shown and described what are at present considered to be the preferred embodiments of the invention, it will be apparent to those skilled in the art that various changes and modifications can be made herein without departing from the scope of the invention as defined by the appended claims.

INDUSTRIAL APPLICABILITY

This invention is useful for providing automatic brightness control for television receivers.

I claim:

1. A method of effecting automatic brightness control for a television receiver comprising the steps of:
    (a) applying a reference level to a reference input of a comparator means;
    (b) coupling a video signal to a signal input of the comparator means;
    (c) rendering the comparator means sensitive both to at least a prescribed portion of the luminance component and to at least a prescribed portion of the horizontal sync component of the video signal and insensitive to other portions of the video signal;
    (d) developing a signal at the output of the comparator means in response to the prescribed portions of the video signal; and
    (e) coupling the developed signal to the receiver's CRT so that effective automatic brightness control is achieved regardless of luminance components corresponding to substantially white scenic representations.

2. A method as defined in claim 1 wherein step (c) comprises the steps of
    (i) phase-shifting the Horizontal Retrace pulse;
    (ii) clipping the phase-shifted Horizontal Retrace pulse, and
    (iii) applying the resultant (Video Blanking) pulse to an enabling input of the comparator means.

3. A method as defined in claim 2 wherein the Horizontal Retrace pulse is phase-shifted and clipped in a manner such that the Video Blanking pulse has a duration somewhat less than the transmitted Horizontal Blanking pulse so that the comparator means is enabled for a portion of the horizontal synchronizing interval.

4. A method as defined in claim 3 wherein the Horizontal Retrace pulse is advanced with respect to the transmitted Horizontal Blanking pulse and clipped so that the leading edge of the Video Blanking pulse occurs substantially simultaneously with the leading edge of the transmitted Horizontal Blanking pulse and the trailing edge of the Video Blanking pulse occurs before the trailing edge of the transmitted Horizontal Blanking pulse.

5. A method as defined in either claim 3 or claim 4 wherein the Horizontal Retrace pulse is advanced and clipped so that the trailing edge of the Video Blanking pulse occurs approximately 1 microsecond before the trailing edge of the transmitted Horizontal Blanking pulse.

6. A video black level reference circuit comprising:
    comparator means having a reference input coupled to a reference level and a signal input coupled to a video signal for developing an output in response to the difference between the reference level and both the blackest portion of the luminance component of the video signal as well as a prescribed portion of the horizontal sync component of the video signal;
    a time-constant network coupled to the output of the comparator means, the signal input of the comparator means, and to the television receiver CRT for effecting the brightness level of the CRT; and
    Video Blanking means coupled to an enabling input of the comparator for rendering the comparator means responsive to the luminance component and a portion of the horizontal sync component of the video signal but unresponsive to other portions of the video signal.

7. A circuit as defined in claim 6 wherein the Video Blanking means comprises:
    means for phase-shifting the Horizontal Retrace pulse and
    means for clipping the phase-shifted Retrace pulse so as to develop a Video Blanking pulse having a duration less than the duration of the transmitted Horizontal Blanking pulse.

8. A circuit as defined in claim 7 wherein the means for phase-shifting and means for clipping are so arranged and constructed that the Video Blanking pulse has a leading edge substantially coincident with the leading edge of the transmitted Horizontal Blanking pulse and a trailing edge approximately one microsecond in advance of the trailing edge of the transmitted Horizontal Blanking pulse.

* * * * *